Patented June 11, 1946

UNITED STATES PATENT OFFICE 2,402,075

THERMOSETTING POLYVINYL COMPOSITIONS

Emil E. Novotny, Prospectville, George K. Vogelsang, La Mott, and Ernest E. Novotny, Philadelphia, Pa., assignors to Durite Plastics, Incorporated, Philadelphia, Pa., a corporation of Pennsylvania No Drawing. Application March 5, 1943, Serial No. 478,120

2 Claims. (Cl. 260—23)

The present invention relates to a method of thermosetting polyvinyl acetals and polyvinyl alcohols, which comprises reacting the same in the presence of aluminum stearate under the influence of heat, and thermosetting vinyl compositions comprising a polymer selected from the class consisting of the polyvinyl acetals and polyvinyl alcohols and mixed with aluminum stearate as the thermosetting agent, as well as thermoset vinyl compositions resulting from the reaction of a polymer taken from the class consisting of polyvinyl acetals and polyvinyl alcohols with aluminum stearate as the thermosetting agent.

The use of "uncured," "unvulcanized," or "non-thermoset" polyvinyls is attendant with certain limitations and disadvantages. Thus, plasticized acetals have a tendency towards tackiness so that when articles processed out of them are pressed together for an appreciable length of time, particularly in warm surroundings, they tend to adhere to one another. The polyvinyl acetals behave as true thermoplastics and as such lose their strength, soften and virtually melt under the influence of heat. The polyvinyl acetals, after fabrication, retain their original solubility so that such articles cannot be used in the presence of solvents such as methanol, ethanol, isopropanol, butanol, the methyl, ethyl and butyl ethers of ethylene glycol, dioxane, dioxolane, etc.

The aforementioned limitations and drawbacks which are more or less inherent in the polyvinyl acetals as such can be mitigated or indeed altogether eliminated by converting the same over into a substantially thermo rigid or a vulcanized rubbery state through the use of aluminum stearate as the thermosetting or vulcanizing agent. A "vulcanized" polyvinyl acetal is characterized by a comparative freedom from tackiness, an excellent heat resistance, and an excellent resistance towards the usual solvents. At the same time the physical properties, particularly with respect to the tensile strength, are enhanced. It is possible to procure "vulcanizates" that range all the way from extremely soft and flexible products to materials that resemble ebonite in hardness.

It is believed that the mechanism of cure, i. e., conversion to an infusible, infusible thermo rigid, or vulcanized rubbery state via the use of aluminum stearate, involves the engendering of cross linkages between the molecules of the vinyl chain polymers. It is to be noted that both the polyvinyl alcohol as well as the commercial polyvinyl acetals contain alcoholic (OH) groups. It is believed that these hydroxy (OH) groups are in some way or other involved in the process of cure.

In its simplest embodiment the method of the present invention consists in admixing with the vinyl polymer aluminum stearate and then reacting the said mixture under the influence of heat.

Various compounding agents may be included in the compositions. Thus plasticizers, softening agents, fillers, pigments, blister inhibitors, dyes, odorants, processing aids, modifiers, lubricants, activators, stabilizers, extenders of various sorts, solvents, etc., may be included in the compositions when compounding for specific applications. It is also permissible to include in the compositions other distinctly different types of "vulcanizing agents" along with the aluminum stearate of the present invention.

There are numerous materials which appear to exert a beneficial effect upon the ultimate physicals of the composition. Included among such substances are zinc oxide and stearic acid.

Any of the commercially available types and grades of aluminum stearate are suitable in carrying out the present invention. The commercial grades of aluminum stearate usually consist of mixtures of one or more of the aluminum stearates, e. g., aluminum mono-stearate, aluminum di-stearate, aluminum tri-stearate, and may include unreacted alumina compounds such as aluminum oxides or hydroxides as well as free stearic acid. The precise analysis of the aluminum stearate does not appear to exert any marked effect upon the utility and efficacy of the same for the purposes of the present invention.

The quantity of aluminum stearate used as the thermosetting agent can be varied between wide limits. As little as $\frac{1}{10}$ of one per cent on the weight of the vinyl polymer is capable of bringing about a discernible thermosetting, curing, or vulcanization of the vinyl polymer. On the other hand, it is permissible to use as much as 100.0 parts of aluminum stearate per 100.0 parts of vinyl polymer. However, the most useful range lies between one and twenty per cent of aluminum stearate per 100.0 parts of vinyl polymer.

Any of the commercially available polyvinyl alcohols and polyvinyl acetals are suitable in the pursuit of the present invention. Suitable polyvinyl acetals are the reaction products of the polyvinyl alcohols with any of the common aldehydes including formaldehyde, acetaldehyde, propionaldehyde, butyl-aldehyde, iso-butyl-aldehyde, etc., etc. The permissible hydroxy (OH) group content of the acetals may vary between wide limits, and as far as we known all of the commercially available grades that we have tested lend themselves with more or less equal facility for use in the present invention.

The aluminum stearate may be used either in the form of a dispersion or it may be incorporated by mixing upon differential rolls or in a Banbury. In its simplest aspects the mill compounding of the polyvinyl acetal entails mixing the same with appropriate plasticizers followed by the addition of the aluminum stearate, zinc oxide, lubricants, modifying agents, processing aids, fillers, pigments, dyestuffs, etc. Where the acetal is to be utilized in the form of solutions, the polyvinyl acetal may either first be mill mixed with the plasticizer and the mixture then dissolved in the solvent, or the acetal may be directly dissolved in the solvent and the plasticizer then added or, alternatively, the acetal may be added to a mixture of the solvent and the plasticizer. The other ingredients are then added, including the aluminum stearate. In a variation of the above, the ingredients are compounded upon differential rolls and the resultant compound is then dissolved and dispersed in the solvent. A very thorough mixing of the ingredients is essential, e. g., the ingredients may be mixed in a pebble mill for a period of many hours.

In general, polyvinyl compounds containing aluminum stearate as the thermosetting agent may be processed and worked up in substantially the same manner in which similar stock but not containing aluminum stearate is manipulated. Polyvinyl stock containing aluminum stearate as the thermosetting agent can be satisfactorily press cured in thicknesses up to ⅛" at temperatures ranging between 275° F. and 310° F. in a period of from 30 to 45 minutes. Properly compounded stock may be press cured in polished molds without the use of any "mold lubricant." The vulcanizates may, of course, be pulled hot, i. e., the molds do not have to be cooled prior to the removal of the stock from the mold. This feature, characteristic of thermoset compositions, expedites and simplifies the fabrication.

In preparing thermosetting polyvinyl acetal compositions containing aluminum stearate, careful consideration should be given the selection of the plasticizer both as regards the type and the quantity. The plasticizer has an important bearing upon the tackiness, freeze resistance, odor, solvent resistance, and sensitiveness towards water. For many ordinary applications, 40.0 parts of plasticizer to 60.0 parts of polyvinyl stock yields good results.

There are a number of materials that effectively expedite the processing in one way or another enhancing the physical properties, feel, or appearance of stock thermoset with aluminum stearate. We recommend the use of Cauras, a petroleum polymer as an example of a material which facilitates the procurement of a smooth running stock, functions as a stabilizing agent and lubricant, and improves the "feel" of the vulcanizate.

When using aluminum stearate as the thermosetting agent any of the usual fillers and pigments may be utilized. Among the carbon blacks it appears that the softer varieties are just as satisfactory as the harder types with the added advantage of easy processability. Hydrated alumina is an excellent low gravity non-carbon pigment. Ultra-fine particle sized calcium carbonates are economical and also prove very satisfactory, though not the equal of hydrated alumina. The inclusion of a filler or pigment in compounds containing aluminum stearate as the thermosetting agent is desirable from the standpoint of reducing tackiness, increasing the hardness, and minimizing blistering or porosity. Their use reduces costs and often improves the physical properties particularly the solvent resistance. Excessively loaded stock possesses a lower tensile strength than stock loaded to the optimum point or stock wholly unloaded.

To the best of our knowledge polyvinyl compounds thermoset with aluminum stearate are odorless, tasteless, and void of any health hazard. Whatever taste or odor the thermoset product possesses must be attributed to the polyvinyl base per se, the plasticizers, or ingredients other than the aluminum stearate.

Polyvinyl acetal stock rendered thermosetting through the use of aluminum stearate is ideally suited for the production of coated goods as exemplified by raincoat fabrics and goods suitable for the production of delousing bags, so-called "rubber boats or rafts," collapsible pontoons, protective cloths, etc. The formulations and the manipulative technique in the instance of polyvinyl acetal stock rendered curable through the presence of aluminum stearate is substantially identical with that ordinarily employed in the case of non-thermoset polyvinyl stock. Of course, fabrics, etc., coated with these thermosetting compositions must be subjected to a baking or curing operation, preferably between 265° F. and 285° F. for a period of approximately 45 minutes.

In the preparation of proofed goods, it is highly desirable to "dust" the coated composition prior to vulcanization. Such dusting reduces the tackiness of the unvulcanized stock; minimizes the danger of rolled goods sticking; reduces the tackiness of the vulcanized goods from the standpoint of tack tests; breaks the continuity of the surface skin and its ordinary rigidity, thus providing a softer and more pliable feel, together with a pleasing, velvety dull luster. Among the preferred dusting agents are talcum powder, hydrated alumina, Buca clay, starch, and finely powdered mica.

Base coatings made with properly formulated compositions utilizing aluminum stearate as the vulcanizing agent readily meet the usual freeze resistance specifications. Great care must be exercised in the selection of plasticizers. In general multi-layered coatings are preferable to single coats of equal thickness.

In the making of seams with fabrics proofed with polyvinyl acetal compositions rendered thermosetting by the inclusion of aluminum stearate, it is essential to employ a cement. Such cements are advantageously made out of a polyvinyl acetal dispersion or solution including aluminum stearate as the thermosetting agent.

The following formulations depicting the methods and compositions of the present invention are purely illustrative:

*Example 1*

| | Parts |
|---|---|
| Polyvinyl butyral | 4.00 |
| Dibutoxy ethyl phthalate | 3.50 |
| Alcohol | 25.00 |
| Butanol | 1.00 |
| Zinc oxide | 0.20 |
| Yellow oxide | 0.40 |
| Channel black | 0.04 |
| Stearic acid | 0.06 |
| Calcium carbonate | 1.00 |
| Hydrated alumina | 1.00 |
| Aluminum stearate | 0.10 |

The above ingredients may be placed into a suitable grinder or mill, e. g., ball mill, and ground until complete solution of the vinyl polymer has been effected and the other insoluble ingredients have been thoroughly dispersed into the composition. Alternatively the polyvinyl butyral may be dissolved in the alcohol and after solution has been effected, the other ingredients may be incorporated. It is often desirable to first dissolve the acetal in the solvent and to make a dispersion out of the other products. It is then only necessary to mix the dispersion with the acetal solution in the desired proportions.

A mixing procedure that is oftentimes desirable for the preparation of solutions suitable for spreader work consists in mixing all the ingredients except the solvent upon differential rolls and to then take the resultant compound, preferably cut up into small pieces, and dissolve and disintegrate it in the solvent.

*Example 2*

In carrying out the present invention one may use pre-plasticized vinyl polymer as is shown in the example below:

| | Parts |
|---|---|
| Pre-plasticized polyvinyl butyral (60 parts acetal; 40 parts plasticizer) | 100.00 |
| Aluminum stearate | 5.00 |
| Zinc oxide | 5.00 |
| Stearic acid | 1.50 |
| Lubricating wax | 0.50 |
| Processing aid | 3.00 |
| Soft black | 20.00 |

The above composition when press cured at 300° F. for 30 to 40 minutes yields a stock possessed of a tensile strength of 3310 pounds per square inch, an elongation of 180 per cent, and a Shore durometer hardness of 77–81 units.

*Example 3*

| | Parts |
|---|---|
| Pre-plasticized polyvinyl butyral (60 parts acetal; 40 parts plasticizer) | 100.0 |
| Aluminum stearate | 1.0 |
| Zinc oxide | 5.0 |
| Stearic acid | 1.5 |
| Lubricating wax | 0.5 |
| Processing aid | 3.0 |
| Soft black | 20.0 |

The above composition when press cured at 300° F. for 30 to 40 minutes yielded a "vulcanizate" possessed of a tesile strength of 2500 pounds per square inch, an elongation of 310 per cent, and a Shore durometer hardness of 58–60 units.

*Example 4*

| | Parts |
|---|---|
| Polyvinyl butyral | 60.0 |
| Dibutoxy ethyl phthalate | 45.0 |
| Di-2-ethyl hexoate triethylene glycol | 10.0 |
| Zinc oxide | 8.0 |
| Magnesia | 2.0 |
| Yellow oxide | 6.0 |
| Channel black | 0.6 |
| Stearic acid | 0.9 |
| Calcium carbonate | 15.0 |
| Hydrated alumina | 15.0 |
| Aluminum stearate | 5.0 |

The above ingredients are best mixed on differential rolls. It is convenient to have the initial temperature prior to the incorporation of the aluminum stearate in the neighborhood of 200° F. which temperature should gradually be permitted to drop to about 160° F., at which time the aluminum stearate may be incorporated.

The use of excessive quantities of aluminum stearate is in general to be avoided as it is found that such excesses contribute no additional desirable attributes to the ultimate cured product, but on the contrary the physicals are usually adversely effected.

The degree of "cure" procurable through the use of aluminum stearate is distinctly limited in character. Experimentation has revealed that the cure can progress to only a certain point beyond which the aluminum stearate does not effect a further cure. This is in marked contrast to the type of "thermosetting," "curing," or "vulcanizing" agent referred to in our copending application, Serial No. 564,554, filed November 21, 1944. For this reason the present inventors in drawing a distinction between the vulcanization potentiality of these two types prefer to refer to the vulcanizing agent of the present invention, i. e., aluminum stearate, as a "secondary vulcanizing agent" because there is a distinct limit to the ultimate strengths procurable through the use of this type of vulcanizing agent.

Aluminum stearate may be used as the thermosetting agent in the preparation of polyvinyl acetal stock suitable for use in press molding, injection molding, extrusion molding, etc. It can also be utilized in the preparation of stock for calendering operation, e. g., production of coated or proofed fabrics. Aluminum stearate is also well suited to the preparation of polyvinyl acetal solutions or dispersions which are suitable for use as cements, impregnants, and as coating materials for the production of proofed goods, etc. The compositions of Examples 2 and 3 are typical of compounds suitable for molding operations. The compound of Example 1 is suitable for use in the preparation of coated goods by the spreader technique. The composition of Example 4 is suitable for coating goods by direct calendering.

In many applications, particularly those in which but small quantities of aluminum stearate are utilized as the setting agent, it is found desirable to admix the aluminum stearate with some sort of diluent. Materials such as hydrated alumina are ideally suited for this purpose. If desired, an additional quantity of free stearic acid may be included to expedite the mill incorporation of the thermosetting agent.

The foregoing examples are illustrative of the use of the polyvinyl acetals. Aluminum stearate, however, is also an effective curing, vulcanizing or thermosetting agent for polyvinyl alcohols. Polyvinyl alcohols may be processed in much the same manner in which the acetals are worked. The principal difference between the alcohols and the acetals resides in the fact that for the former it is necessary to utilize plasticizers of a type and character which are generally considered hydrophilic or water-soluble whereas with the acetals hydrophobic plasticizers are used. It is also to be noted that the plasticization of polyvinyl alcohols is more difficult than in the instance of the acetals. Representative plasticizers for the polyvinyl alcohols are glycerine and in general the polyhydric alcohols including ethylene glycol, diethylene glycol, and triethylene glycol. Certain polyamines and amino alcohols are also suitable for this purpose. The recommended procedure is to first plasticize the polyvinyl alcohol and to then incorporate the aluminum stearate as the thermosetting agent into the plasticized mass. In some instances it suffices to wet the polyvinyl alcohol in a finely divided form with an appropriate plasticizer and to then work in the aluminum stearate. This latter procedure, however, does not yield as satisfactory results as are procurable by mixing upon hot differential rolls.

In general, to prepare a thermosetting polyvinyl alcohol composition the polyvinyl alcohol should be thoroughly plasticized with an appropriate plasticizer before the aluminum stearate is incorporated. The resultant compounds are satisfactorily press cured at temperatures of between 275° F. and 325° F. for periods ranging from a few minutes to approximately an hour.

Any of the commercially available polyvinyl alcohols lend themselves for use in the present invention. It should be pointed out, however, that the polyvinyl alcohols which are obtained by the saponification of polyvinyl acetate usually contain a greater or lesser quantity of acetal groups. The greater the percentage of acetal groups the more readily the material may be plasticized and the greater its tolerance for hydrophobic plasticizers. The polyvinyl alcohols with high saponification numbers are much more easily processed as regards ease of plasticization and the incorporation of thermosetting agents.

Polyvinyl acetal or polyvinyl alcohol stock possessed of a greater degree of cure than what is obtainable through the sole use of aluminum stearate as the curing agent may be gotten through the inclusion of a vulcanizing agent of the type set forth in our copending applications, Serial No. 464,524, filed November 4, 1942, and Serial No. 466,480, filed November 21, 1942, along with the aluminum stearate. In this manner it is possible to procure faster cures and there is virtually no limit to the degree of cure obtainable.

Through the use of the aluminum stearate in conjunction with polyvinyl acetals and alcohols the sensitiveness towards water is appreciably diminished. The insensitization toward water is more or less a function of the degree of vulcanization." Thermosetting polyvinyl compounds with aluminum stearate has the effect of markedly increasing the heat resistance of the resultant stock as compared to a similarly compounded but unvulcanized stock. The solvent resistance of the polyvinyl acetals is appreciably increased through the vulcanization with aluminum stearate. Vulcanization with aluminum stearate results in a very appreciable diminution in tack of plasticized polyvinyl acetal compositions.

Thermosetting vinyl compositions comprising a polymer selected from the class consisting of the polyvinyl acetals and polyvinyl alcohols admixed with aluminum stearate as the thermosetting agent are preeminently suited for use in the various arts and industries, specifically in the manufacture of such varied products as adhesives, rubbery compositions, plastic compositions, floor coverings, frictional elements, bonding agents, glues, impregnating materials, inks, insecticides, leather products, lacquers, molding compositions, paints, photographic products, plywood, resinous compositions, stiffening agents, varnishes, water-dispersible paints, proofed goods, raincoat fabrics, tent fabrics, tarpaulin fabrics, delousing bags, collapsible boats, collapsible pontoons, etc.

As many apparently widely different embodiments of this invention can be made without departing from the spirit and scope thereof, it is to be understood that we do not limit ourselves to the specific embodiments thereof except as defined in the appended claims.

The invention has been described in connection with a number of illustrative embodiments, materials, proportions, conditions and arrangements of operation for carrying out the invention. It is, therefore, to be understood that the invention is not dependent upon any explanations or theories which have been set forth as descriptive of the actions involved, nor dependent upon the accuracy or soundness of any theoretical statement so advanced.

We claim:

1. The method of curing vinyl compositions selected from the class consisting of polyvinyl acetals and polyvinyl alcohols, which comprises admixing the said compositions with aluminum stearate as curing agent and then reacting together the said materials by subjecting the mixture to curing temperatures ranging between about 275° F. and 310° F. for a period of from about 30 minutes to 45 minutes.

2. Cured vinyl compositions obtained by the method defined in claim 1.

EMIL E. NOVOTNY.
GEORGE K. VOGELSANG.
ERNEST E. NOVOTNY.